Feb. 17, 1925.

J. H. HAMMOND, JR 1,526,852

MEANS FOR AND METHOD OF LIMITING INTERFERENCE IN WIRELESS SIGNALING

Original Filed Aug. 20, 1917

Inventor:
John Hays Hammond, Jr.
by Emery, Booth, Janney & Varney, Attys.

Patented Feb. 17, 1925.

1,526,852

UNITED STATES PATENT OFFICE.

JOHN HAYS HAMMOND, JR., OF GLOUCESTER, MASSACHUSETTS.

MEANS FOR AND METHOD OF LIMITING INTERFERENCE IN WIRELESS SIGNALING.

Application filed August 20, 1917, Serial No. 187,061. Renewed May 31, 1924.

*To all whom it may concern:*

Be it known that I, JOHN HAYS HAMMOND, Jr., a citizen of the United States, and a resident of Gloucester, in the county of Essex and Commonwealth of Massachusetts, have invented an Improvement in Means for and Method of Limiting Interference in Wireless Signaling, of which the following description, in connection with the accompanying drawings, is a specification, like characters on the drawings representing like parts.

This invention relates to means for and methods of limiting the effect of interference, caused by static or other disturbances encountered in wireless telegraphy, and in the preferred embodiment thereof it depends for its operation upon characteristics of gaseous or like detectors.

In order that the principle of the invention may be readily understood I shall set forth one form of means for practicing my invention and the mode best known to me for carrying the same into effect.

In the accompanying drawing:—

Figure 1:
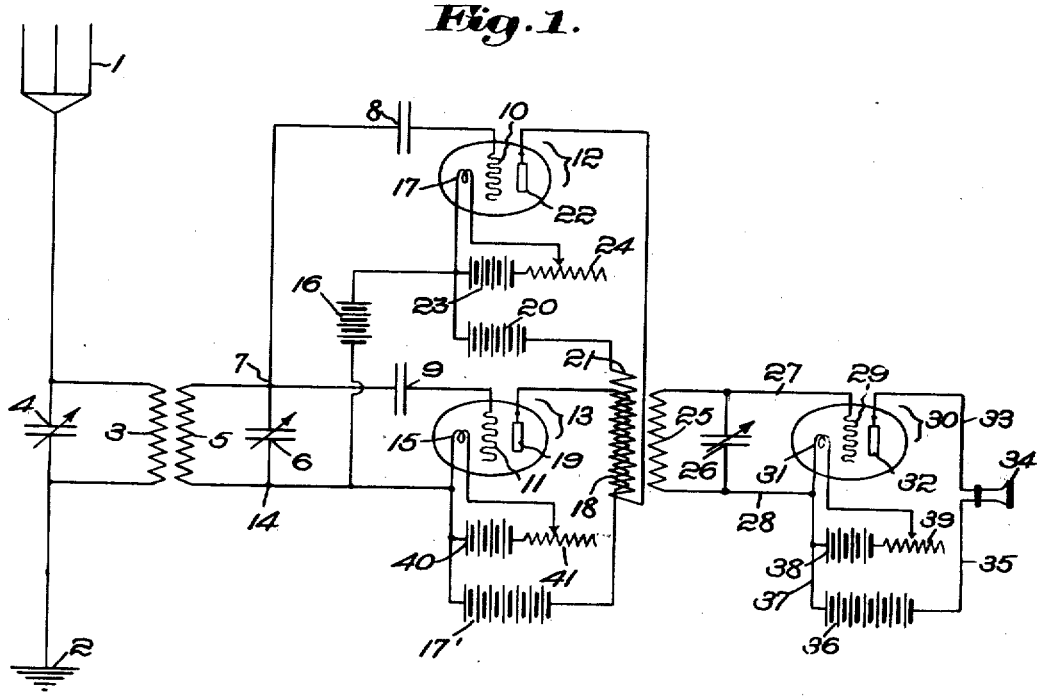
Figure 2:
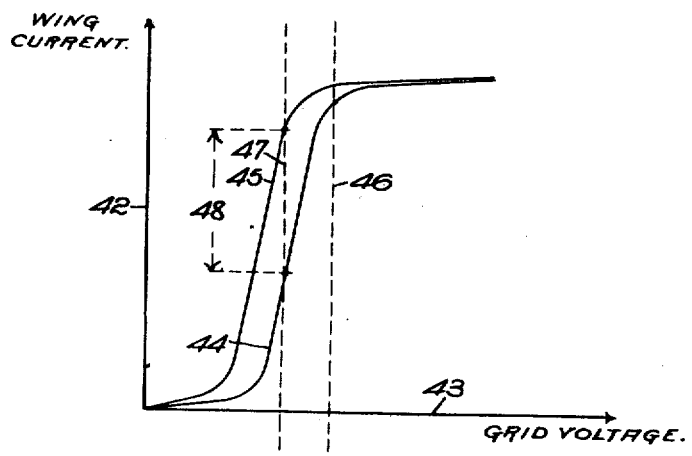

Fig. 1 is a diagram representing in detail a receiving system for radiant energy embodying my invention, and showing one form of means for carrying the same into effect; and Fig. 2 diagrammatically represents curves for gaseous detectors.

In accordance with the preferred embodiment of my invention and with the preferred mode of practicing the same, I make use of certain characteristics of gaseous detectors, and in carrying out my invention I preferably provide a radio-dynamic receiving system which I shall describe in detail without, however, in any way limiting my invention to use therewith, since it is clearly to be understood that the invention may be employed in radio-dynamic receiving systems of other types, and in other relations.

Referring to the specific form of my invention shown in Fig. 1, the antenna of the radio-dynamic receiving system is indicated at 1, a ground at 2, and a primary winding at 3. The condenser indicated at 4 constitutes a portion of the preferred or ordinary tuner, such condenser being preferably a variable one. A winding of a secondary, closed, oscillatory circuit is indicated at 5, and included in said circuit is a condenser 6, also constituting a portion of the tuner.

From the terminal 7 of the condenser 6 two leads or conductors extend through two stoppage condensers 8 and 9 to the grids 10 and 11, of two preferably similar gaseous detectors 12 and 13, preferably of the audion type. From the terminal 14 of the condenser 6 one lead or conductor extends directly to the heated filament 15 of the gaseous detector 13, while another lead or conductor extends through a suitable battery or other source of potential 16 to the heated filament 17 of the gaseous detector 12.

From the filament 15 of the gaseous detector 13 a lead or conductor extends through a high potential battery 17′ and a coil 18 to the plate electrode 19 of the gaseous detector 13. From the filament 17 of the gaseous detector 12 a lead or conductor extends through a high potential battery 20 and a coil 21 to the plate electrode 22 of the gaseous detector 12. A battery 23 is arranged to act through a variable resistance 24 to heat the filament 17.

The windings 18 and 21 are arranged in such a direction with respect to each other that, with the normal currents flowing through them, the two magnetic fields therein oppose each other. In other words, the said two windings are arranged to "buck."

I have indicated at 25 a secondary winding which is connected in a circuit including a condenser 26, said circuit 25, 26 being inductively coupled with the windings 18 and 21. From the terminals of the condenser 26 there extend leads or conductors 27 and 28, the former being connected to the grid 29 of a gaseous detector 30 preferably of the audion type. The conductor 28 is connected to the heated filament 31 of said gaseous detector. Instead of said type of detector I may employ a detector of any other desired or suitable type. Herein I have represented said detector as having a plate 32 from which extends a conductor 33 in circuit with an indicator in the form of a telephone 34. Also in circuit with said telephone is a conductor 35 connected with a battery 36 or other suitable source of potential, and from said battery extends a lead or conductor 37 connected with the terminal of the conductor 28. In circuit with said heated filament 31 is a heating battery 38 and a variable resistance 39.

In circuit with the heated filament 15 of the detector 13 is a heating battery 40 and a variable resistance 41.

The effect of a normal signal falling upon the receiving system will be to induce electrical oscillations in the circuit 5, 6, thereby causing potential fluctuations between the terminals 7 and 14, and thus in turn causing potential fluctuations between the terminals of the two stoppage condensers 8 and 9. This results in charging the grids 10 and 11 negatively, thus influencing the total current in the circuits 20, 21, 22 and 17', 18, 19.

In Fig. 2 I have plotted in a vertical direction at 42 the current from the plate electrode to the filment electrode of each of the detectors 12 and 13, and in a horizontal direction at 43 I have plotted the potential of the grid electrodes of the detectors. The curve 44 is a typical curve for gaseous detectors, and represents the behavior of the gaseous detector 13 in Fig. 1. The curve 45 represents the behavior of the gaseous detector 12, the displacement of the curve 45 with respect to the curve 44 being caused by the introduction of the polarizing battery 16 with its negative terminal connected with the filament 17 of the detector 12.

If now the potential of the grids 10 and 11 under normal conditions, namely when signals are coming in, is that indicated by the dotted line 46 in Fig. 2, the apparatus herein shown will operate as follows:

Upon the charging of the grids 10 and 11 by the incoming signal as hereinbefore described, the current in the circuit 15, 17', 18, 19 may vary considerably, while that in the circuit 17, 20, 21, 22 will vary but slightly if at all. Hence, under such circumstances, there will be practically no current variations in the coil 21 and the circuit 25, 26 will readily respond to the current variations in the coil 18. Therefore, the detector 30 and the telephone or telephones 34 will respond. If, however, strong static discharges or interference, or even powerful signals, are received, the grids 10 and 11 become charged to the potential diagrammatically indicated by the dotted line 47 in Fig. 2. The gaseous detector 12 now also becomes active, thus causing current variations in the coil 21. Owing, however, to the opposed relation of the windings or coils 21 and 18 the net inductive effect in such case on the circuit 25, 26 is only that of the difference indicated by the arrows 48 in Fig. 2.

Referring to the disclosed embodiment of my invention, it is important that the currents produced in the so-called "bucking" coils should be phased so that they may oppose each other. The construction and arrangement of the system herein shown are such as to insure such phased relation. In this and in other respects my invention differs from the so-called balanced valve of Marconi, whose circuits necessarily put the audion detector currents out of phase.

The effect of the invention, therefore, of which one form or type of means is herein disclosed, is to cause exceptionally strong disturbances to choke themselves off before reaching the last detector, herein typically indicated at 30.

It will be evident from the foregoing description that I limit the effect of interference, static or other disturbances upon the receiving system, and particularly upon the detector or detectors thereof, and preferably by employing certain characteristics of gaseous or like detectors with which I preferably provide opposed windings, one type or form of which is indicated at 18, 21.

Having thus described one illustrative embodiment of my invention and the best mode known to me for practicing the same, I desire it to be understood that although specific terms are employed, they are used in a generic and descriptive sense and not for purposes of limitation, the scope of the invention being set forth in the following claims.

Claims—

1. A system for receiving electrical oscillations, including an oscillatory circuit, a primary detector and a secondary detector both controlled by said circuit, a pair of circuits controlled by said detectors respectively and each including a source of energy and a coil, said coils being coupled inductively to each other, an oscillatory circuit coupled inductively to both of said coils, a detector controlled by said last-mentioned circuit, and a circuit controlled by said last-mentioned detector and including a source of energy and a telephone receiver, said detectors being responsive in different degrees respectively to impulses having a given intensity.

2. A system for receiving electrical oscillations, including a circuit, a primary detector and a secondary detector both controlled by said circuit, a pair of circuits controlled by said detectors respectively and each including a coil, said coils being inductively coupled one to the other, and each of said coils being arranged to oppose the action of the other of said coils, a circuit inductively coupled to both of said coils, a detector controlled by said last mentioned circuit, and a circuit controlled by said last mentioned detector, said primary detector and said second secondary detector being responsive in different degrees respectively to electrical impulses in said first mentioned circuit having a given intensity.

3. A system for receiving electrical oscillations including a circuit, a primary detector and a secondary detector arranged in parallel and both controlled by said circuit, each of said detectors comprising a container and three electrodes arranged therein, a pair of circuits controlled by said detectors respectively, and each including a source of energy and a coil, the coil of one circuit being inductively connected to and arranged to act in opposition to the coil of the other circuit, an oscillatory circuit coupled inductively to both of said coils, and a detector controlled by said last mentioned circuit, said first mentioned detectors being responsive in different degrees respectively to impulses having a given intensity.

4. A system for receiving electrical oscillations, including an oscillatory circuit, a pair of detectors controlled by said circuit and arranged in parallel, each having a potential gradient controlling means, means for differently biasing said gradient means, a pair of circuits controlled by said dectectors respectively and each including a coil, the coil of one of said circuits being operatively connected to and arranged to act in opposition to the coil of the other of said circuits and means arranged to be controlled by the conjoint and simultaneous action of both of said pair of circuits.

5. A system for receiving electrical oscillations, including an oscillatory circuit, a pair of detectors controlled by said circuit and arranged in parallel, each of said detectors having a grid, means for differently biasing said grids with respect to one another, a pair of circuits controlled by said detectors respectively and each including a coil, the coil of one of said circuits being operatively connected to and arranged to act in opposition to the coil of the other of said circuits and means arranged to be controlled by the conjoint and simultaneous action of both of said pair of circuits, said detectors being responsive in different degrees respectively to impulses having a given intensity.

6. A system for receiving electrical oscillations, including receiving means responsive to electrical oscillations, a primary detector and a secondary detector both controlled by said receiving means, each of said detectors having a grid, means for normally maintaining the grids of said detectors at different potentials, a pair of circuits controlled by said detectors respectively and each including a coil, one of said coils being inductively connected to and arranged to act in opposition to the other of said coils, and means controlled by the conjoint and simultaneous action of both of said pair of coils, said detectors being responsive in different degrees respectively to received impulses having a given intensity.

7. A system for receiving electrical impulses, including an electrical circuit, a primary wave responsive device and a secondary wave responsive device operatively connected in parallel to said circuit, each of said devices including a container and three electrodes arranged therein, means for heating one of said electrodes of each device, means for impressing upon one electrode of one of said devices an initial potential different from the initial potential of the corresponding terminal of the other of said devices so as to cause said devices to respond in different degrees respectively to impulses received by said first mentioned circuit having a given intensity, a pair of circuits controlled respectively by said devices and each including a coil, one of said coils being operatively connected to and arranged to act in opposition to the other of said coils, and means controlled by the conjoint and simultaneous action of both of said pair of circuits.

8. A wireless receiving system comprising in combination means responsive to radiant energy, an indicating device, and two similar and equal circuit arrangements differentially connecting said indicating device to said means which include a three electrode detector, each detector having a grid, and means for biasing the grids of said detectors differently.

9. A wireless receiving system comprising a detector and means for limiting the effect of high potentials on said detector, comprising a plurality of three-electrode thermionic tubes having their output circuits connected so as to oppose each other.

In testimony whereof, I have signed my name to this specification.

JOHN HAYS HAMMOND, Jr.

ing inductively connected to and arranged to act in opposition to the coil of the other circuit, an oscillatory circuit coupled inductively to both of said coils, and a detector controlled by said last mentioned circuit, said first mentioned detectors being responsive in different degrees respectively to impulses having a given intensity.

4. A system for receiving electrical oscillations, including an oscillatory circuit, a pair of detectors controlled by said circuit and arranged in parallel, each having a potential gradient controlling means, means for differently biasing said gradient means, a pair of circuits controlled by said dectectors respectively and each including a coil, the coil of one of said circuits being operatively connected to and arranged to act in opposition to the coil of the other of said circuits and means arranged to be controlled by the conjoint and simultaneous action of both of said pair of circuits.

5. A system for receiving electrical oscillations, including an oscillatory circuit, a pair of detectors controlled by said circuit and arranged in parallel, each of said detectors having a grid, means for differently biasing said grids with respect to one another, a pair of circuits controlled by said detectors respectively and each including a coil, the coil of one of said circuits being operatively connected to and arranged to act in opposition to the coil of the other of said circuits and means arranged to be controlled by the conjoint and simultaneous action of both of said pair of circuits, said detectors being responsive in different degrees respectively to impulses having a given intensity.

6. A system for receiving electrical oscillations, including receiving means responsive to electrical oscillations, a primary detector and a secondary detector both controlled by said receiving means, each of said detectors having a grid, means for normally maintaining the grids of said detectors at different potentials, a pair of circuits controlled by said detectors respectively and each including a coil, one of said coils being inductively connected to and arranged to act in opposition to the other of said coils, and means controlled by the conjoint and simultaneous action of both of said pair of coils, said detectors being responsive in different degrees respectively to received impulses having a given intensity.

7. A system for receiving electrical impulses, including an electrical circuit, a primary wave responsive device and a secondary wave responsive device operatively connected in parallel to said circuit, each of said devices including a container and three electrodes arranged therein, means for heating one of said electrodes of each device, means for impressing upon one electrode of one of said devices an initial potential different from the initial potential of the corresponding terminal of the other of said devices so as to cause said devices to respond in different degrees respectively to impulses received by said first mentioned circuit having a given intensity, a pair of circuits controlled respectively by said devices and each including a coil, one of said coils being operatively connected to and arranged to act in opposition to the other of said coils, and means controlled by the conjoint and simultaneous action of both of said pair of circuits.

8. A wireless receiving system comprising in combination means responsive to radiant energy, an indicating device, and two similar and equal circuit arrangements differentially connecting said indicating device to said means which include a three electrode detector, each detector having a grid, and means for biasing the grids of said detectors differently.

9. A wireless receiving system comprising a detector and means for limiting the effect of high potentials on said detector, comprising a plurality of three-electrode thermionic tubes having their output circuits connected so as to oppose each other.

In testimony whereof, I have signed my name to this specification.

JOHN HAYS HAMMOND, Jr.

Certificate of Correction.

It is hereby certified that in Letters Patent No. 1,526,852, granted February 17, 1925, upon the application of John Hays Hammond, jr., of Gloucester, Massachusetts, for an improvement in " Means for and Methods of Limiting Interference in Wireless Signaling," an error appears requiring correction as follows: In the heading of the drawing, for patent number " 1,525,852 " read *1,526,852;* and that the said Letters Patent should be read with this correction therein that the same may conform to the record of the case in the Patent Office.

Signed and sealed this 23d day of June, A. D. 1925.

[SEAL.]

KARL FENNING,
*Acting Commissioner of Patents.*

Certificate of Correction.

It is hereby certified that in Letters Patent No. 1,526,852, granted February 17, 1925, upon the application of John Hays Hammond, jr., of Gloucester, Massachusetts, for an improvement in " Means for and Methods of Limiting Interference in Wireless Signaling," an error appears requiring correction as follows: In the heading of the drawing, for patent number " 1,525,852 " read *1,526,852;* and that the said Letters Patent should be read with this correction therein that the same may conform to the record of the case in the Patent Office.

Signed and sealed this 23d day of June, A. D. 1925.

[SEAL.] 
KARL FENNING,
*Acting Commissioner of Patents.*